United States Patent [19]
Arai et al.

[11] Patent Number: 5,712,365
[45] Date of Patent: Jan. 27, 1998

[54] PROCESS FOR PRODUCING ETHYLENE ALPHA-OLEFIN COPOLYMER

[75] Inventors: Koichi Arai; Makoto Toshimitsu, both of Mie, Japan

[73] Assignee: Tosoh Corporation, Shinnanyo, Japan

[21] Appl. No.: 618,821

[22] Filed: Mar. 20, 1996

[30] Foreign Application Priority Data

Mar. 27, 1995 [JP] Japan ................................. 7-067930

[51] Int. Cl.$^6$ ......................................... G08F 6/28
[52] U.S. Cl. ................................. 528/498; 528/501
[58] Field of Search ............................ 528/498, 501

[56] References Cited

U.S. PATENT DOCUMENTS

| | | | |
|---|---|---|---|
| 3,600,371 | 8/1971 | Marwil | 528/498 |
| 3,809,688 | 5/1974 | Clementi et al. | 528/501 |
| 4,087,602 | 5/1978 | Mietzner et al. | 528/481 |
| 4,105,842 | 8/1978 | Nicco et al. | 526/65 |
| 4,168,356 | 9/1979 | Levrresse et al. | 526/64 |
| 4,436,901 | 3/1984 | Sherk | 528/498 |
| 4,551,509 | 11/1985 | Takayuki et al. | 526/68 |
| 4,754,004 | 6/1988 | Nundenberg et al. | 526/69 |

Primary Examiner—Thomas R. Weber
Attorney, Agent, or Firm—Oblon, Spivak, McClelland, Maier & Neustadt, P.C.

[57] ABSTRACT

A high-temperature high-pressure process for producing an ethylene/α-olefin copolymer is provided in which a saturated hydrocarbon of 4 or less carbons is injected to an unreacted monomer mixture fed to a separator in a high-pressure recycling system. This process enables stable running of the production apparatus for a long term without clogging of the tubing in the high-pressure recycling system.

4 Claims, 1 Drawing Sheet

5,712,365

PROCESS FOR PRODUCING ETHYLENE ALPHA-OLEFIN COPOLYMER

BACKGROUND OF THE INVENTION

1. Field of the Invention

The present invention relates to a high-temperature high-pressure process for producing ethylene/α-olefin copolymers. More specifically, the present invention relates to a process for producing an ethylene/α-olefin copolymer comprising steps of copolymerizing ethylene with an α-olefin of three or more carbons in a reactor in the presence of an olefin polymerization catalyst at a reaction pressure of 300–4000 kgf/cm$^2$ at a temperature of from the melting point of the copolymer to 300° C.; reducing the pressure of the resulting reaction mixture to 40–300 kgf/cm$^2$; separating an unreacted monomer mixture from the copolymer by utilizing density difference in a separator; cooling the unreacted monomer mixture to deposit an entrained copolymer; separating the deposited copolymer to recover the unreacted monomer mixture; and feeding the recovered unreacted monomers together with the starting ethylene and α-olefin to the reactor.

In this specification, the aforementioned separator is referred to as a "high-pressure separator", the system of separating the entrained copolymer from the unreacted monomer mixture separated by the high-pressure separator and recycling the recovered unreacted monomer mixture is referred to as a "high-pressure recycling system", the separator employed for this separation is referred to as a "high-pressure recycling separator", and the system of further reducing the pressure of the copolymer separated by the high-pressure separator to recover the remaining unreacted monomer is referred to as a "low-pressure recycling system". The above process is hereinafter called a "high-temperature high-pressure ethylene/α-olefin copolymer production process".

In this specification the "melting point" means the maximum peak temperature of the heat absorption curve which is obtained by differential scanning calorimetry in such a manner that the sample is melted at 200° C. for 5 minutes, solidified by cooling at a rate of 10° C./min to 30° C., and heated again at a temperature rise rate of 10° C./min. The "density of the copolymer" means the density measured according to JIS K6760.

2. Description of the Related Art

In a production process of an ethylene/α-olefin copolymer by a high-temperature high-pressure process by use of a metallocene catalyst, the copolymer of high molecular weight occasionally adheres or deposits onto the inside wall of the high-pressure recycling separator or the tubing of the heat exchanger in the high pressure recycling system to lower the separation efficiency of the separator, or clogs the tubing of the heat exchanger to cause shutdown of the production plant within a short period.

When a Ziegler type catalyst is used, such a phenomenon is less liable to occur. This is presumably due to the fact that the Ziegler catalyst produces a copolymer of broad molecular weight distribution as is well known, the copolymer entrained by the unreacted monomer mixture to the high pressure recycling system has a lower melting point and a lower molecular weight (weight-average molecular weight of several thousands or lower), and the entrained copolymer in a liquid state in the system sweeps away the minute amount of the entrained high molecular weight copolymer. In contrast, a metallocene catalyst produces a copolymer of narrow molecular weight distribution and does not produces a low molecular weight copolymer to sweep the adhering or deposited high molecular weight copolymer, thereby causing adhesion or deposition of the high molecular weight copolymer. The copolymer entrained by the unreacted monomer has the same molecular weight as the final product (weight average molecular weight of tens of thousands).

The above problems have been found firstly by the inventors of the present invention.

SUMMARY OF THE INVENTION

An object of the present invention is to provide a high-temperature high-pressure process for producing ethylene/α-olefin copolymer in which the efficiency of a high-pressure separator is improved with sufficient separation of a high molecular weight copolymer entrained by the unreacted monomer mixture without drop of separation efficiency or clogging of tubing of heat exchangers by preventing deposition or adhesion of the high molecular weight copolymer on the inside wall of the separator or the tubing of heat exchangers, and thereby a copolymer of a desired density (in particular, a relatively low density) can be produced for a long term without plant shutdown.

It was found by the inventors of the present invention that the efficiency of separation of the unreacted monomer mixture from the produced copolymer in the high-pressure separator is improved by the presence of a saturated hydrocarbon having a density lower than the unreacted monomer mixture with the reaction mixture to increase the difference of the density of the produced copolymers from that of the unreacted monomer-saturated hydrocarbon mixture, thereby the copolymer entrained by the unreacted monomer mixture being decreased and the copolymer of a lower range of the density being producible. The present invention has been accomplished on the basis of the above findings.

The process for producing an ethylene/α-olefin copolymer of the present invention comprises steps of copolymerizing ethylene with an α-olefin of three or more carbons in a reactor in the presence of an olefin polymerization catalyst at a reaction pressure ranging from 300 to 4000 kgf/cm$^2$ at a reaction temperature ranging from the melting point of the copolymer to 300° C.; reducing the reaction pressure to 40–300 kgf/cm$^2$; separating an unreacted monomer mixture from the copolymer by a high-pressure separator; separating an entrained copolymer from the unreacted monomer mixture by a high-pressure recycling separater to recover unreacted monomer mixture; and feeding the recovered unreacted monomer mixture together with the starting ethylene and α-olefin to the reactor, wherein a saturated hydrocarbon of four or less carbons having a density lower than that of the unreacted monomer mixture (hereinafter referred to as a "low-density saturated hydrocarbon") is allowed to coexist in the high-pressure separator.

DETAILED DESCRIPTION OF THE PREFERRED EMBODIMENT

Figure 1:
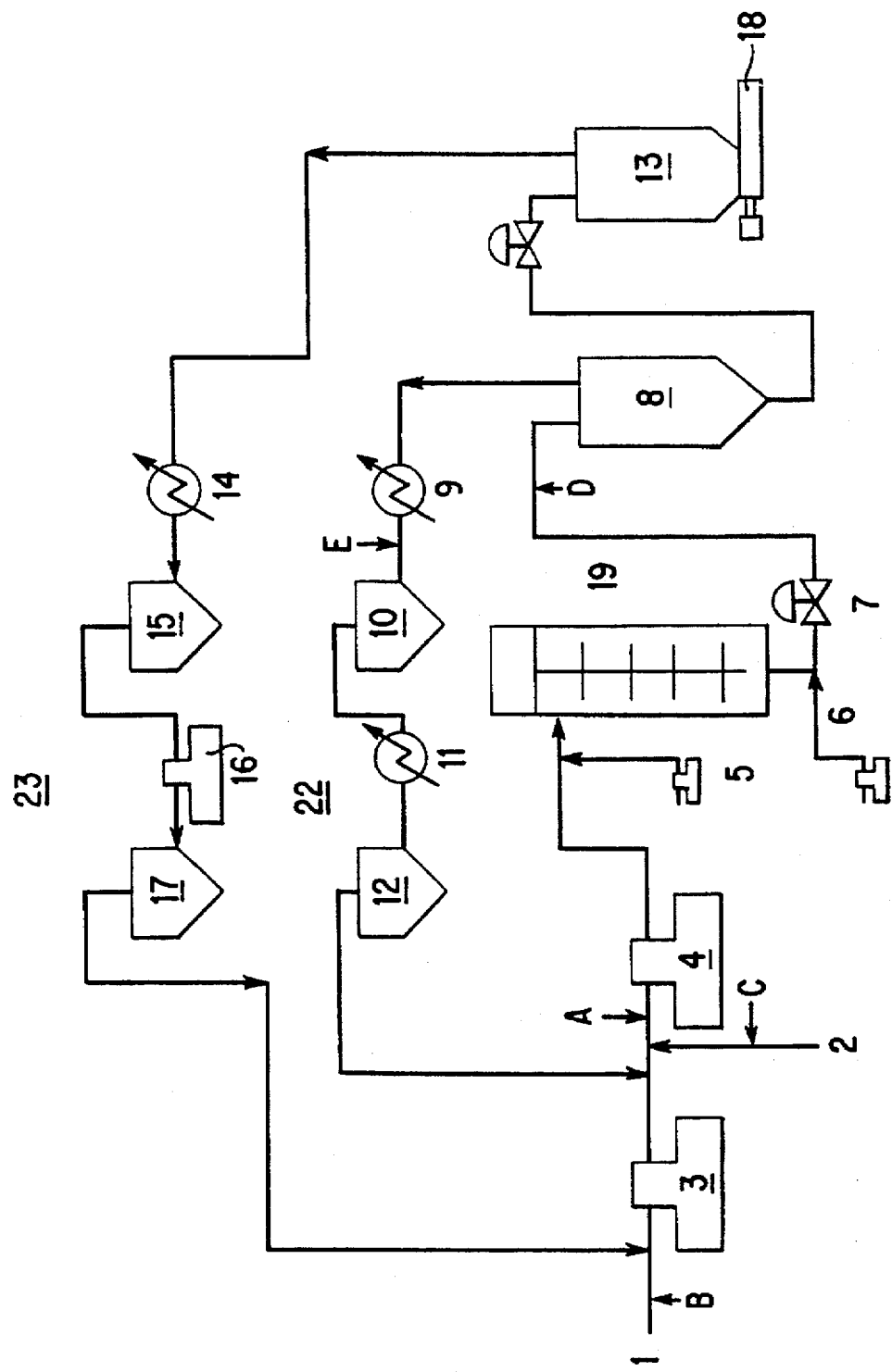
FIG. 1 is a flow sheet of an example of the process of the present invention for production of an ethylene/α-olefin copolymer.

The present invention is described below in detail.

The reactor employed in the present invention may be either an autoclave type reactor or a tube type reactor. An example of the process employing an autoclave type reactor is described by reference to FIG. 1. The starting materials, ethylene and α-olefin, are fed through the respective feed lines 1 and 2, and pressurized by compressors 3 and 4 to a prescribed reaction pressure. A catalyst is fed by a catalyst injection pump 5 to a reactor 19. In the reactor 19, polymerization is allowed to proceed with stirring by a stirrer. To inhibit the reaction after the reactor, a reaction terminator is injected through a line 6. The reaction pressure in the reactor is controlled by a pressure control valve 7. The reaction temperature is controlled by the catalyst injection rate. The ethylene/α-olefin copolymer produced in the reactor 19 and an unreacted monomer mixture is separated from each other by a high-pressure separator 8. The separated unreacted monomer mixture is recycled through a heat exchanger 9, a high-pressure recycling separator 10, a heat exchanger 11, and a high-pressure recycling separator 12 of a high-pressure recycling system 22 to the compressor 4. On the other hand, the ethylene/α-olefin copolymer separated at the high-pressure separator is brought to a lower pressure state through a pressure control valve, and is delivered to a low-pressure separator 13 to separate further the still remaining unreacted monomer mixture from the ethylene/α-olefin copolymer. The unreacted monomer is recycled to the compressor 3 through a heat exchanger 14, a separator 15, a low-pressure compressor 16 for re-compression, and a separator 17 of a low-pressure recycling system 23. The separated ethylene/α-olefin copolymer is extruded from an extruder 18 at the bottom of the low pressure separator 13.

The copolymerization may be conducted under conventional reaction conditions. Specifically, the reaction temperature is in the range of from the melting point of the copolymer to 300° C., preferably from the melting point to 270° C. The reaction pressure is in the range of from 300 to 4000 kgf/cm$^2$, preferably from 500 to 2000 kgf/cm$^2$ in consideration of the production cost. The operation pressure gauge pressure of the low-pressure recycling system is in the range of from 0.1 to 35 kgf/cm$^2$, preferably from 0.5 to 20 kgf/cm$^2$, and that of the high-pressure recycling system is in the range of from 40 to 300 kgf/cm$^2$, preferably from 80 to 250 kgf/cm$^2$. The operation temperature of the low-pressure recycling system and the high-pressure recycling system are respectively in the range of from 50° to 250° C., preferably from 70° to 230° C.

The useful low-density saturated hydrocarbon for the injection in the present invention includes methane, ethane, propane, n-butane, and isobutane. The saturated hydrocarbons may be one or a mixture of two or more of the above hydrocarbons having a density lower than that of the unreacted monomer mixture in the high-pressure separator. When a substance other than the low-density saturated hydrocarbon such as nitrogen is employed additionally, the nitrogen, which is less compatible with the unreacted monomer mixture than the saturated hydrocarbon, raises the critical point in the vapor-liquid equilibrium of the unreacted monomer mixture with the rise of the nitrogen concentration. Thereby, it may cause condensation and dissolution of the α-olefin of the unreacted monomer mixture in a large amount into the copolymer or to deteriorate the quality of the copolymer, or may damage the compressor at a higher nitrogen concentration owing to the compression heat generation of the nitrogen much larger than that of the saturated hydrocarbon. Therefore, the concentration of the nitrogen should not be increased as high as that of the saturated hydrocarbon, and is generally not more than about 15 mol %.

The low-density saturated hydrocarbon may be injected at any point in the process where the injected saturated hydrocarbon can be introduced into the high-pressure separator 8. It may be injected at two or more points. The practicable injection point includes, as shown in FIG. 1, point A at the suction side of the compressor 4 for feeding the starting materials and the recovered monomer mixture to the reactor 19, point B at the ethylene feeding line 1, point C at the α-olefin feeding line 2, point D at the flow line of the reaction mixture into the high-pressure separator 8, and point E at the flow line of the unreacted monomer mixture to the high-pressure recycling separator 10.

In the case where the low-density saturated hydrocarbon is injected at the inlet of the high-pressure separator 8, the saturated hydrocarbon is heated prior to the injection to a temperature higher than the reaction temperature preferably by 10° to 60° C., more preferably by 10° to 40° C. At the temperature of the injected saturated hydrocarbon of not higher by 10° C. than the reaction temperature, the injection of the saturated hydrocarbon lowers the temperature of the unreacted monomer mixture and the copolymer, which decreases the density difference between the unreacted monomer mixture and the copolymer, tending to cause drop of the separation efficiency of the high-pressure separator. On the other hand, at the temperature of the injected saturated hydrocarbon of higher by 60° C. than the reaction temperature, the heat load to the heat exchanger increases in the high-pressure recycling system.

The separation of the unreacted monomer mixture from the copolymer in the high-pressure separator is conducted by utilizing the difference of the densities thereof. When the concentration of the α-olefin in the unreacted monomer mixture is increased to produce a copolymer of a lower density, the density of the unreacted monomer mixture approaches the density of the copolymer, resulting in smaller difference between the densities. In such a case, the copolymer is entrained in a larger amount by the unreacted monomer mixture, which may cause adhesion and deposition of the copolymer on the inside wall of the high-pressure recycling separator and in the tubing of the heat exchanger in the high-pressure recycling system to lower the separation efficiency of the high-pressure recycling separator or may cause the clogging of the tubing of the heat exchanger.

Accordingly, in the present invention, a saturated hydrocarbon having a density lower than that of the monomer mixture is injected under the conditions of the temperature and pressure as shown by Equation (a) below. Thereby, the density of the unreacted monomer mixture is lowered in comparison with that in the absence of the saturated hydrocarbon to enlarge the density difference to improve the separation efficiency and to retard the adhesion and deposition of the copolymer on the inside walls or the like of the-apparatuses. The preferred density difference depends on the kind of α-olefin and the average residence time of the unreacted monomer mixture and the copolymer. With 1-butene as the α-olefin, the density difference is preferably not less than 0.40, and with 1-hexene the difference is preferably not less than 0.315.

$$(\text{Copolymer density})-(\text{Unreacted monomer mixture density})=(d0+ dI0)\times(P_1/120)\times(T_1/433) \tag{a}$$

where d0: Difference of densities (g/cc) between the unreacted monomer mixture and the copolymer at a pressure of 120 kgf/cm$^2$ and at a temperature of 160° C. in the absence of the low-density saturated hydrocarbon (depending on the kind of the α-olefin), dI0: Increase of the difference of densities (g/cc) between the unreacted monomer mixture and the copolymer at a pressure of 120 kgf/cm$^2$ and at a temperature of 160° C. by injection of the low-density saturated hydrocarbon (depending on the kind of the low-density saturated hydrocarbon and the kind of the α-olefin), $P_1$: Total pressure (kgf/cm$^2$) of the high-pressure separator, and $T_1$: Temperature (K) of the high-pressure separator.
(This equation was found experimentally by the inventors of the present invention.)

The amount of the low-density saturated hydrocarbon to be injected is equal to the amount thereof discharged outside the system by dissolution and entrainment with the copolymer, namely the amount of the low-density saturated hydrocarbon discharged from the extruder 18. The amount depends on the kind of the low-density saturated hydrocarbon, the kind of the α-olefin in the copolymer and the monomer mixture, the ratio of the amounts of the α-olefin to ethylene, and the temperature and pressure of the system. The concentration of the low-density saturated hydrocarbon in the unreacted monomer mixture in the high-pressure separator is preferably in the range of from 4 to 48 mol %, more preferably from 5 to 40 mol % of the total of the low-density saturated hydrocarbon and the unreacted monomer mixture. At the concentration of the low-density saturated hydrocarbon concentration of lower than 4 mol %, the effect is lower in increasing the density difference between the unreacted monomer mixture and the copolymer, or the value of dI0 in Equation (a) is lower, thereby the separation efficiency in the high-pressure separator being not improved sufficiently; and the adhesion and deposition of the copolymer on the tubing in the high-pressure recycling system is not sufficiently retarded. The concentration of the low-density saturated hydrocarbon concentration of higher than 48 mol % causes increase of the load for degassing of the unreacted monomer from the copolymer in the steps after the extruder 18, unstableness of the reaction by decrease of the copolymerization speed caused by the non-copolymerizable saturated hydrocarbon in the reactor, and increase of the difference of the ratio of the ethylene to α-olefin at the reactor inlet from that at the reactor outlet (the difference being caused by the difference of the consumption speed between ethylene and α-olefin in copolymerization in the reactor) can be increased to result in broadening of copolymer constitution distribution to deteriorate the product quality.

The presence of the low-density saturated hydrocarbon in the high-pressure separator improves the separation efficiency of the unreacted monomer mixture from the copolymer in the high-pressure separator. In particular, troubles caused by adhesion and deposition of the copolymer in the high-pressure recycling system is significantly retarded by controlling the concentration of the low density saturated hydrocarbon within the range of from 4 to 48 mol % to the total of the hydrocarbon and the unreacted monomer mixture. However, the unreacted monomer mixture and the copolymer is not completely separated.

The copolymer entrained in a small amount by the unreacted monomer mixture is cooled and comes to deposit to adhere to tubing or other surface. To decrease the deposition of the minor amount of the copolymer onto the tubing or other surface and to lengthen the time before the clogging of the tubing or the like, the low-density saturated hydrocarbon is injected at the inlet of the high-pressure recycling separator 10. As explained below, the low-density saturated hydrocarbon brought into contact with the unreacted monomer mixture lowers the solubility of the copolymer in the unreacted monomer mixture to deposit the most of the copolymer in the separator and to prevent the deposition of the copolymer in the subsequent heat exchanger and tubing not to cause troubles by adhesion and deposition of the copolymer.

When the low-density saturated hydrocarbon is injected at the point E, an insufficient amount of injection of the saturated hydrocarbon achieves less effect, whereas an excessive amount of the injection causes increase of the load for degassing of the unreacted monomer from the copolymer in the steps after the extruder 18, unstableness of the reaction by decrease of the copolymerization speed caused by the non-copolymerizable saturated hydrocarbon in the reactor, and increase of the difference of the ratio of the ethylene to α-olefin at the reactor inlet from that at the reactor outlet to result in broadening of copolymer constitution distribution to deteriorate the product quality.

The amount of injection of the low density saturated hydrocarbon at the point E is controlled to be in the range of from 5 to 50 mol %, preferably from 5 to 40 mol % of the total of the injected hydrocarbon and the unreacted monomer mixture. When the low-density saturated hydrocarbon is injected in the high-pressure recycling system 22 in such a manner, the concentration of the saturated hydrocarbon becomes lower in the high-pressure separator 8 than in the injection point because part of the saturated hydrocarbon is carried by the copolymer into the low-pressure separater. For example, the concentration ranging from 5 to 50 mol % in the high-pressure recycling system results in concentration of from 4 to 48 mol % in the high-pressure separator.

In the case where low-density saturated hydrocarbon is injected before the inlet of the high-pressure recycling separator 10 as described above, when a heat exchanger 9 is provided between the high-pressure separator 8 and the separator 10, the injection point should be between the heat exchanger and the separator, for example, at point E in FIG. 1. If the low-density saturated hydrocarbon is injected at the inlet of the heat exchanger, the copolymer will deposit from the unreacted monomer mixture to cause clogging of the tubing in the heat exchanger. Conventionally, a heat exchanger is provided between the high-pressure separator and the high-pressure recycling separator for cooling to deposit the copolymer. However, the heat exchanger is not essential in practicing the present invention. When the heat exchanger 9 is employed, the operation temperature of the heat exchanger is set higher by 10° to 60° C., preferably by 10° to 40° C. than the melting point of the copolymer. At the operation temperature of higher by 60° C. or more than the melting point of the copolymer, the unreacted monomer mixture is not sufficiently cooled, while at the operation temperature of higher by 10° C. or less than the melting point, the adhesion or solidification of the coplymer is liable to occur on the inside wall of the heat exchanger tubing.

The injection of a saturated hydrocarbon of 4 or less carbons into the unreacted monomer mixture introduced to the high-pressure recycling separator 10 causes instantaneous deposition of the copolymer in the uncreated monomer mixture, because the solubility of a high-molecular weight ethylene/α-olefin copolymer in the unreacted monomer mixture decreases with the decrease of the α-olefin concentration in the unreacted monomer mixture under a fixed temperature and pressure conditions as shown by the equation below, whereby adhesion and deposition of the copolymer is less liable to occur on the inside wall of the tubing.

$$w=0.3\times\exp(a\times T_2\times P_2\times(100-Y_n)/100)$$

where w: Relative solubility of the high-molecular weight copolymer in the unreacted monomer mixture (relative to the solubility at a pressure of 200 kgf/cm² and at a temperature of 200° C. [g-copolymer/g-unreacted monomer mixture])

a: Solubility coefficient (depending on the kind of α-olefin)
For 1-hexene: $a=1.190\times10^{-6}\times YM+1.374\times10^{-5}$
For 1-butene: $a=6.216\times10^{-7}\times YM+1.374\times10^{-5}$ $P_2$: Total pressure [kgf/cm²]

$T_2$: Temperature of the total of the unreacted monomer mixture and the low-density saturated hydrocarbon [K]

YM: Concentration of the α-olefin in the total of the unreacted monomer mixture and the low-density saturated hydrocarbon [mol %]

Yn: Concentration of the saturated hydrocarbon of 4 or less carbons in the total of the unreacted monomer mixture and the low-density saturated hydrocarbon [mol %]

(This equation was found experimentally by the inventors of the present invention.)

The olefin polymerization catalyst applicable in the present invention may be any conventional catalyst. In particular, metallocene catalysts, and chromium- or vanadium-containing catalysts are suitable. The metallocene catalyst includes organometallic compounds comprising (a) a transition metal compound having a transition metal of Group 4 of Periodic Table, (b) a protonic acid, a Lewis acid, an ionizing ionic compound or a Lewis acid compound, and (c) any of elements of Groups 1, 2, and 13 of Periodic Table, Sn and Zn.

The transition metal compound containing a transition metal of Group 4 of Periodic Table employed in the present invention is represented by General Formula (1) or (2) below:

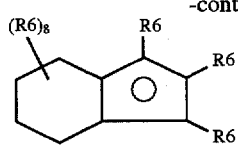

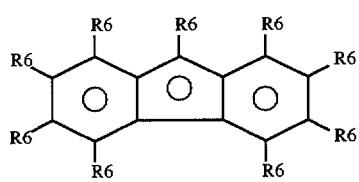

wherein M1 is an atom of titanium, zirconium, or hafnium; each Y is independently a hydrogen atom, a halogen atom, an alkyl group of 1 to 20 carbons, or a aryl, arylalkyl or alkylaryl group of 6 to 20 carbons; and R1 and R2 are independently a ligand represented by General Formula (3), (4), (5), or (6):

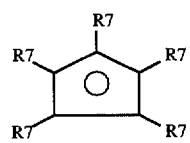

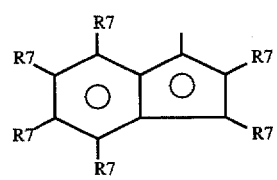

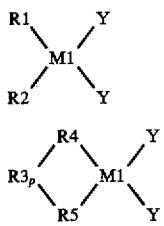

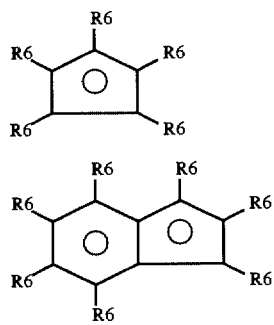

(where each R6 is independently a hydrogen atom, an alkyl group of 1 to 20 carbons, or a aryl, arylalkyl or alkylaryl group of 6 to 20 carbons); the ligands and M1 form together a sandwich structure; R4 and R5 are independently a ligand represented by General Formula (7), (8), (9), or (10):

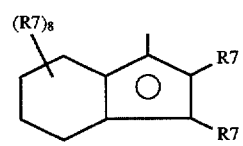

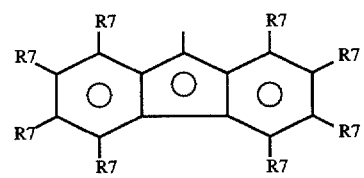

(where each R7 is independently a hydrogen atom, an alkyl group of 1 to 20 carbons, or a aryl, arylalkyl or alkylaryl group of 6 to 20 carbons); the ligand and M1 form together a sandwich structure; R3 is represented by General Formula (11) below:

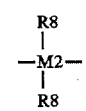

(where each R8 is independently a hydrogen atom, an alkyl group of 1 to 20 carbons, or a aryl, arylalkyl or alkylaryl group of 6 to 20 carbons); M2 is an atom of carbon, silicon, germanium or tin; and R3 serves as a bridge between R4 and R5; and p is an integer of from 1 to 5.

The compound represented by General Formula (1) or (2) includes dichlorides such as
bis(cyclopentadienyl)titanium dichloride,
bis(cyclopentadienyl)zirconium dichloride,
bis(cyclopentadienyl)hafnium dichloride,
bis(methylcyclopentadienyl)titanium dichloride, bis(methylcyclopentadienyl)zirconium dichloride,
bis(methylcyclopentadienyl)hafnium dichloride,
bis(butylcyclopentadienyl)titanium dichloride,
bis(butylcyclopentadienyl)zirconium dichloride,
bis(butylcyclopentadienyl)hafnium dichloride,
bis(pentamethylcyclopentadienyl)titanium dichloride,
bis(pentamethylcyclopentadienyl)zirconium dichloride,
bis(pentamethylcyclopentadienyl)hafnium dichloride,
bis(indenyl)titanium dichloride,
bis(indenyl)zirconium dichloride,
bis(indenyl)hafnium dichloride,
methylenebis(cyclopentadienyl)titanium dichloride,
methylenebis(cyclopentadienyl)zirconium dichloride,
methylenebis(cyclopentadienyl)hafnium dichloride,
methylenebis(methylcyclopentadienyl)titanium dichloride,
methylenebis(methylcyclopentadienyl)zirconium dichloride,
methylenebis(methylcyclopentadienyl)hafnium dichloride,
methylenebis(butylcyclopentadienyl)titanium dichloride,
methylenebis(butylcyclopentadienyl)zirconium dichloride,
methylenebis(butylcyclopentadienyl)hafnium dichloride,
methylenebis(tetramethylcyclopentadienyl)titanium dichloride,
methylenebis(tetramethylcyclopentadienyl)zirconium dichloride,
methylenebis(tetramethylcyclopentadienyl)hafnium dichloride,
ethylenebis(indenyl)titanium dichloride,
ethylenebis(indenyl)zirconium dichloride,
ethylenebis(indenyl)hafnium dichloride,
ethylenebis(tetrahydroindenyl)titanium dichloride,
ethylenebis(tetrahydroindenyl)zirconium dichloride,
ethylenebis(tetrahydroindenyl)hafnium dichloride,
ethylenebis(2-methyl-1-indenyl)titanium dichloride,
ethylenebis(2-methyl-1-indenyl)zirconium dichloride,
ethylenebis(2-methyl-1-indenyl)hafnium dichloride,
isopropylidene(cyclopentadienyl-9-fluorenyl)titanium dichloride,
isopropylidene(cyclopentadienyl-9-fluorenyl)zirconium dichloride,
isopropylidene(cyclopentadienyl-9-fluorenyl)hafnium dichloride,
isopropylidene(cyclopentadienyl-2,7-dimethyl-9-fluorenyl)titanium dichloride,
isopropylidene(cyclopentadienyl-2,7-dimethyl-9-fluorenyl)zirconium dichloride,
isopropylidene(cyclopentadienyl-2,7-dimethyl-9-fluorenyl)hafnium dichloride,
isopropylidene(cyclopentadienyl-2,7-di-t-butyl-9-fluorenyl)titanium dichloride,
isopropylidene(cyclopentadienyl-2,7-di-t-butyl-9-fluorenyl)zirconium dichloride,
isopropylidene(cyclopentadienyl-2,7-di-t-butyl-9-fluorenyl)hafnium dichloride,
diphenylmethylene(cyclopentadienyl-9-fluorenyl)titanium dichloride,
diphenylmethylene(cyclopentadienyl-9-fluorenyl)zirconium dichloride,
diphenylmethylene(cyclopentadienyl-9-fluorenyl)hafnium dichloride,
diphenylmethylene(cyclopentadienyl-2,7-dimethyl-9-fluorenyl)titanium dichloride,
diphenylmethylene(cyclopentadienyl-2,7-dimethyl-9-fluorenyl)zirconium dichloride,
diphenylmethylene(cyclopentadienyl-2,7-dimethyl-9-fluorenyl)hafnium dichloride,
diphenylmethylene(cyclopentadienyl-2,7-di-t-butyl-9-fluorenyl)titanium dichloride,
diphenylmethylene(cyclopentadienyl-2,7-di-t-butyl-9-fluorenyl)zirconium dichloride,
diphenylmethylene(cyclopentadienyl-2,7-di-t-butyl-9-fluorenyl)hafnium dichloride,
dimethylsilanediylbis(cyclopentadienyl)titanium dichloride,
dimethylsilanediylbis(cyclopentadienyl)zirconium dichloride,
dimethylsilanediylbis(cyclopentadienyl)hafnium dichloride,
dimethylsilanediylbis(methylcyclopentadienyl)titanium dichloride,
dimethylsilanediylbis(methylcyclopentadienyl)zirconium dichloride,
dimethylsilanediylbis(methylcyclopentadienyl)hafnium dichloride,
dimethylsilanediylbis(butylcyclopentadienyl)titanium dichloride,
dimethylsilanediylbis(butylcyclopentadienyl)zirconium dichloride,
dimethylsilanediylbis(butylcyclopentadienyl)hafnium dichloride,
dimethylsilanediylbis(2,4,5-trimethylcyclopentadienyl)titanium dichloride,
dimethylsilanediylbis(2,4-dimethylcyclopentadienyl)titanium dichloride,
dimethylsilanediylbis(3-methylcyclopentadienyl)titanium dichloride,
dimethylsilanediylbis(4-t-butyl-2-methylcyclopentadienyl)titanium dichloride,
dimethylsilanediylbis(tetramethylcyclopentadienyl)titanium dichloride,
dimethylsilanediylbis(indenyl)titanium dichloride,
dimethylsilanediylbis(2-methylindenyl)titanium dichloride,
dimethylsilanediylbis(tetrahydroindenyl)titanium dichloride,
dimethylsilanediyl(cyclopentadienyl-9-fluorenyl)titanium dichloride,
dimethylsilanediyl(cyclopentadienyl-2,7-dimethyl-9-fluorenyl)titanium dichloride,
dimethylsilanediyl(cyclopentadienyl-2,7-di-t-butyl-9-fluorenyl)titanium dichloride,
dimethylsilanediylbis(2,4,5-trimethylcyclopentadienyl)zirconium dichloride,
dimethylsilanediylbis(2,4-dimethylcyclopentadienyl)zirconium dichloride,
dimethylsilanediylbis(3-methylcyclopentadienyl)zirconium dichloride, dimethylsilanediylbis(4-t-butyl-2-methylcyclopentadienyl)zirconium dichloride,
dimethylsilanediylbis(tetramethylcyclopentadienyl)hafnium dichloride,
dimethylsilanediylbis(indenyl)zirconium dichloride,
dimethylsilanediylbis(2-methylindenyl)zirconium dichloride,
dimethylsilanediylbis(tetrahydroindenyl)zirconium dichloride,
dimethylsilanediyl(cyclopentadienyl-9-fluorenyl)zirconium dichloride,
dimethylsilanediyl(cyclopentadienyl-2,7-dimethyl-9-fluorenyl)zirconium dichloride,
dimethylsilanediyl(cyclopentadienyl-2,7-di-t-butyl-9-fluorenyl)zirconium dichloride,
dimethylsilanediylbis(2,4,5-trimethylcyclopentadienyl)hafnium dichloride,
dimethylsilanediylbis(2,4-dimethylcyclopentadienyl)hafnium dichloride,
dimethylsilanediylbis(3-methylcyclopentadienyl)hafnium dichloride,
dimethylsilanediylbis(4-t-butyl-2-methylcyclopentadienyl)hafnium dichloride,
dimethylsilanediylbis(tetramethylcyclopentadienyl)hafnium dichloride,
dimethylsilanediylbis(indenyl)hafnium dichloride,
dimethylsilanediylbis(2-methylindenyl)hafnium dichloride,
dimethylsilanediylbis(tetrahydroindenyl)hafnium dichloride,
dimethylsilanediyl(cyclopentadienyl-9-fluorenyl)hafnium dichloride,
dimethylsilanediyl(cyclopentadienyl-2,7-dimethyl-9-fluorenyl)hafnium dichloride,
dimethylsilanediyl(cyclopentadienyl-2,7-di-t-butyl-9-fluorenyl)hafnium dichloride,
diethylsilanediylbis(2,4,5-trimethylcyclopentadienyl)titanium dichloride,
diethylsilanediylbis(2,4-dimethylcyclopentadienyl)titanium dichloride,
diethylsilanediylbis(3-methylcyclopentadienyl)titanium dichloride,
diethylsilanediylbis(4-t-butyl-2-methylcyclopentadienyl)titanium dichloride,
diethylsilanediylbis(tetramethylcyclopentadienyl)titanium dichloride,
diethylsilanediylbis(indenyl)titanium dichloride,
diethylsilanediylbis(2-methylindenyl)titanium dichloride,
diethylsilanediylbis(tetrahydroindenyl)titanium dichloride,
diethylsilanediyl(cyclopentadienyl-9-fluorenyl)titanium dichloride,
diethylsilanediyl(cyclopentadienyl-2,7-dimethyl-9-fluorenyl)titanium dichloride,
diethylsilanediyl(cyclopentadienyl-2,7-di-t-butyl-9-fluorenyl) titanium dichloride,
diethylsilanediylbis(2,4,5-trimethylcyclopentadienyl)zirconium dichloride,
diethylsilanediylbis(2,4-dimethylcyclopentadienyl)zirconium dichloride,
diethylsilanediylbis(3-methylcyclopentadienyl)zirconium dichloride,
diethylsilanediylbis(4-t-butyl-2-methylcyclopentadienyl)zirconium dichloride,
diethylsilanediylbis(tetramethylcyclopentadienyl)zirconium dichloride,
diethylsilanediylbis(indenyl)zirconium dichloride,
diethylsilanediylbis(2-methylindenyl)zirconium dichloride,
diethylsilanediylbis(tetrahydroindenyl)zirconium dichloride,
diethylsilanediyl(cyclopentadienyl-9-fluorenyl)zirconium dichloride,
diethylsilanediyl(cyclopentadienyl-2,7-dimethyl-9-fluorenyl)zirconium dichloride,
diethylsilanediyl(cyclopentadienyl-2,7-di-t-butyl-9-fluorenyl)zirconium dichloride,
diethylsilanediylbis(2,4,5-trimethylcyclopentadienyl)hafnium dichloride,
diethylsilanediylbis(3-methylcyclopentadienyl)hafnium dichloride,
diethylsilanediylbis(4-t-butyl-2-methylcyclopentadienyl)hafnium dichloride,
diethylsilanediylbis(tetramethylcyclopentadienyl)hafnium dichloride,
diethylsilanediylbis(indenyl)hafnium dichloride,
diethylsilanediylbis(2-methylindenyl)hafnium dichloride,
diethylsilanediylbis(tetrahydroindenyl)hafnium dichloride,
diethylsilanediyl(cyclopentadienyl-9-fluorenyl)hafnium dichloride,
diethylsilanediyl(cyclopentadienyl-2,7-dimethyl-9-fluorenyl)hafnium dichloride,
diethylsilanediyl(cyclopentadienyl-2,7-di-t-butyl-9-fluorenyl)hafnium dichloride,
diphenylsilanediylbis(2,4,5-trimethylcyclopentadienyl)titanium dichloride,
diphenylsilanediylbis(2,4-dimethylcyclopentadienyl)titanium dichloride,
diphenylsilanediylbis(3-methylcyclopentadienyl)titanium dichloride,
diphenylsilanediylbis(4-t-butyl-2-methylcyclopentadienyl)titanium dichloride,
diphenylsilanediylbis(tetramethylcyclopentadienyl)titanium dichloride,
diphenylsilanediylbis(indenyl)titanium dichloride,
diphenylsilanediylbis(2-methylindenyl)titanium dichloride,
diphenylsilanediylbis(tetrahydroindenyl)titanium dichloride,
diphenylsilanediyl(cyclopentadienyl-9-fluorenyl)titanium dichloride,
diphenylsilanediyl(cyclopentadienyl-2,7-dimethyl-9-fluorenyl)titanium dichloride,
diphenylsilanediyl(cyclopentadienyl-2,7-di-t-butyl-9-fluorenyl)titanium dichloride,
diphenylsilanediylbis(2,4,5-trimethylcyclopentadienyl)zirconium dichloride,
diphenylsilanediylbis(2,4-dimethylcyclopentadienyl)zirconium dichloride,
diphenylsilanediylbis(3-methylcyclopentadienyl)zirconium dichloride,
diphenylsilanediylbis(4-t-butyl-2-methylcyclopentadienyl)zirconium dichloride, diphenylsilanediylbis(tetramethylcyclopentadienyl) zirconium dichloride, diphenylsilanediylbis(indenyl)zirconium dichloride, diphenylsilanediylbis(2-methylindenyl)zirconium dichloride, diphenylsilanediylbis(tetrahydroindenyl)zirconium dichloride, diphenylsilanediyl(cyclopentadienyl-9-fluorenyl) zirconium dichloride, diphenylsilanediyl(cyclopentadienyl-2,7-dimethyl-9-fluorenyl)zirconium dichloride, diphenylsilanediyl(cyclopentadienyl-2,7-di-t-butyl-9-fluorenyl)zirconium dichloride, diphenylsilanediylbis(2,4,5-trimethylcyclopentadienyl) hafnium dichloride, diphenylsilanediylbis(3-methylcyclopentadienyl)hafnium dichloride, diphenylsilanediylbis(4-t-butyl-2-methylcyclopentadienyl)hafnium dichloride, diphenylsilanediylbis(tetramethylcyclopentadienyl) hafnium dichloride, diphenylsilanediylbis(indenyl)hafnium dichloride, diphenylsilanediylbis(2-methylindenyl)hafnium dichloride, diphenylsilanediylbis(tetrahydroindenyl)hafnium dichloride, diphenylsilanediyl(cyclopentadienyl-9-fluorenyl)hafnium dichloride, diphenylsilanediyl(cyclopentadienyl-2,7-dimethyl-9-fluorenyl)hafnium dichloride, diphenylsilanediyl(cyclopentadienyl-2,7-di-t-butyl-9-fluorenyl)hafnium dichloride, and dimethyl compounds, diethyl compounds, dihydro compounds, diphenyl compounds, dibenzyl compounds, and the like of the aforementioned compounds of transition metals of Group 4.

The protonic acid employed in the present invention is a compound represented by General Formula (12) below:

$$[HL1_l][M2R5_4] \qquad (12)$$

where H is a proton, each of L1 is independently a Lewis base, l is a number of $0<l\leq 2$, M2 is an atom of boron, aluminum, or gallium, and each of R5 is independently a halogen-substituted aryl group of 6 to 20 carbons.

The Lewis acid employed in the present invention is a compound represented by General Formula (13) below:

$$[C][M2R5_4] \qquad (13)$$

where C is a carbonium cation or a tropylium cation, M2 is an atom of boron, aluminum, or gallium, and each of R5 is independently a halogen-substituted aryl group of 6 to 20 carbons.

The ionizing ionic compound employed in the present invention is a compound represented by General Formula (14) below:

$$[M3L2_m][M2R5_4] \qquad (14)$$

where M3 is a metal cation selected from Groups 2, 8, 9, 10, 11, and 12 of Periodic Table, L2 is a Lewis base of a cyclopentadienyl group, m is a number of $0\leq m\leq 2$, M2 is an atom of boron, aluminum, or gallium, and each of R5 is independently a halogen-substituted aryl group of 6 to 20 carbons.

The Lewis acid compound employed in the present invention is a compound represented by General Formula (15) below:

$$[M2R5_3] \qquad (15)$$

where M2 is an atom of boron, aluminum, or gallium, and each of R5 is independently a halogen-substituted aryl group of 6 to 20 carbons.

The protonic acid represented by General Formula (12), the Lewis acid represented by General Formula (13), the ionizing ionic compound represented by General Formula (14), and the Lewis acidic compound represented by General Formula (15) are capable of converting the above transition metal compound into a cationic compound, and providing a counter anion which coordinates weekly and/or interacts with the resulting cationic compound, but do not react with it.

The protonic acid represented by General Formula (12) specifically includes: diethyloxonium tetrakis (pentafluorophenyl)borate, dimethyloxonium tetrakis (pentafluorophenyl)borate, tetramethyleneoxonium tetrakis (pentafluorophenyl)borate, hydronium tetrakis (pentafluorophenyl)borate, N,N-dimethylammonium tetrakis(pentafluorophenyl)borate, tri-n-butylammonium tetrakis(pentafluorophenyl)borate, diethyloxonium tetrakis (pentafluorophenyl)aluminate, dimethyloxonium tetrakis (pentafluorophenyl)aluminate, tetramethyleneoxonium tetrakis(pentafluorophenyl)aluminate, hydronium tetrakis (pentafluorophenyl)aluminate, N,N-dimethylammonium tetrakis(pentafluorophenyl)aluminate, and tri-n-butyl ammonium tetrakis(pentafluorophenyl)aluminate, but is not limited thereto.

The Lewis acid represented by General Formula (13) specifically includes: trityl tetrakis(pentafluorophenyl) borate, trityl tetrakis(pentafluorophenyl)aluminate, tropylium tetrakis(pentafluorophenyl)borate, and tropylium tetrakis(pentafluorophenyl)aluminate, but is not limited thereto.

The ionizing ionic compound represented by General Formula (14) specifically includes: lithium salts such as lithium tetrakis(pentafluorophenyl)borate, and lithium tetrakis(pentafluorophenyl)aluminate, and ether complexes thereof; ferrocenium salts such as ferrocenium tetrakis (pentafluorophenyl)borate, and ferrocenium tetrakis (pentafluorophenyl)aluminate; silver salts such as silver tetrakis(pentafluorophenyl)borate, and silver tetrakis (pentafluorophenyl)aluminate, and the like, but is not limited thereto.

The Lewis acidic compound represented by General Formula (15) specifically includes: tris(pentafluorophenyl) borane, tris(2,3,5,6-tetrafluorophenyl)borane, tris(2,3,5,6-tetraphenylphenyl)borane, tris(3,4,5-trifluorophenyl)borane, phenylbis(perfluorophenyl)borane, and tris(3,4,5-trifluorophenyl)aluminum, but is not limited thereto.

The organometal compound containing an element selected from Groups 1, 2, and 13 of Periodic Table, Sn and Zn employed in the present invention is a compound represented by General Formula (16):

$$M5R16_n \qquad (16)$$

where M5 is an element selected from Groups 1, 2, and 13 of Periodic Table, Sn and Zn; each of R16 is independently a hydrogen atom, an alkyl or alkoxy group of 1 to 20 carbons, an aryl, aryloxy, arylalkyl, arylalkoxy, alkylaryl or alkylaryloxy group of 6 to 20 carbons, and at least one R16 is a hydrogen atom, an alkyl group of 1 to 20 carbons, or an aryl, arylalkyl, or alkylaryl group of 6 to 20 carbons; and n is an oxidation number of M5.

The compound represented by General Formula (16) above includes trimethylaluminum, triethylaluminum, triisopropylaluminum, tri-n-butylaluminum, triisobutylaluminum, tri-n-butylaluminum, triamylaluminum, dimethylaluminum ethoxide, diethylaluminum ethoxide, diisopropylaluminum ethoxide, di-n-propylaluminum ethoxide, diisobutylaluminum ethoxide, di-n-butylaluminum ethoxide, dimethylaluminum hydride, diethylaluminum hydride, diisopropylaluminum hydride, di-n-propylaluminum hydride, diisobutylaluminum hydride, and di-n-butylaluminum hydride.

The aforementioned catalyst comprising (a) a transition metal compound having a transition metal of Group 4 of Periodic Table, (b) a protonic acid, a Lewis acid, an ionizing ionic compound, or a Lewis acid compound, and (c) any of elements of Groups 1, 2, and 13 of Periodic Table, Sn and Zn can be prepared, for example, by mixing the component compounds in an inert solvent. However, the method of the catalyst preparation is not limited thereto. The amount of the protonic acid, a Lewis acid, an ionizing ionic compound, or a Lewis acid compound in the catalyst is preferably in the range of from 0.1 to 100 moles, more preferably from 0.5 to 30 moles per mole of the transition metal compound. The amount of the organometal compound is preferably in the rage of from 1 to 10000 moles per mole of the transition metal compound, but is not limited thereto.

The α-olefin of 3 or more carbons employed in the copolymerization of the present invention includes propylene, 1-butene, 4-methyl-1-pentene, 1-hexene, 1-octene, and styrene, and mixtures of two or more thereof, but is not limited thereto.

The present invention is described in more detail by reference to Examples and Comparative Examples without limiting the invention thereto in any way.

EXAMPLE 1

An ethylene/1-hexene copolymer was produced by a high-temperature high-pressure process with a 10-liter reactor provided with a stirrer as shown in FIG. 1. The production was conducted in a continuous manner at a total cycling amount of the ethylene and 1-hexene of 360 kg/h with ethane as the low-density saturated hydrocarbon injected at an injection rate of 1.4 kg/h at the point A immediately before the compressor 4 with the monomers fed to the reactor at a feeding temperature of 40° C. at a reaction pressure of 900 kgf/cm$^2$ and a reaction pressure of 160° C. with stirring at 1500 rpm for 170 hours. The copolymer production rate was 32 kg/h. The catalyst employed was a metallocene catalyst dissolved in toluene, comprising diphenylmethylene(cyclopentadienyl)(fluorenyl)zirconium dichloride, N,N-dimethylanilium tetrakis(pentafluorophenyl)borate, and triisobutylaluminum at a boron/zirconium molar ratio of 1.2, an aluminum/zirconium molar ratio of 250, and a zirconium concentration of 650 μmol/L.

EXAMPLE 2

Ethylene/α-olefin copolymerization was conducted in the same manner as in Example 1 except for use of propane as the low-density saturated hydrocarbon at an injection rate of 10.7 kg/h, the total ethylene/α-olefin recycling amount of 350 kg/h, the reaction temperature of 200° C., use of diphenylmethylene(cyclopentadienyl)(2,7-dimethylfluorenyl)zirconium dichloride in place of diphenylmethylene(cyclopentadienyl)(fluorenyl)zirconium dichloride of the metallocene catalyst, and zirconium concentration of 300 μmol/L. The copolymer production rate was 41 kg/h.

EXAMPLE 3

Ethylene/α-olefin copolymerization was conducted in the same manner as in Example 1 except for injection of ethane heated to 180° C. at the inlet D of the high-pressure separator 8 at an injection rate of 5.7 kg/h, the total circulation amount of ethylene and α-olefin of 300 kg/h, α-olefin/ethylene molar ratio of 2.33 at the inlet of the reactor, and the reaction pressure of 1500 kgf/cm$^2$. The copolymer production rate was 32 kg/h.

EXAMPLE 4

Ethylene/α-olefin copolymerization was conducted in the same manner as in Example 1 except for use of 1-butene as the α-olefin, injection of ethane at the point B of the ethylene feed line at an injection rate of 6.0 kg/h, the total circulation amount of ethylene and α-olefin of 300 kg/h, the α-olefin/ethylene molar ratio of 1.30 at the inlet of the reactor, and the reaction temperature of 180° C. The copolymer production rate was 35 kg/h.

EXAMPLE 5

Ethylene/α-olefin copolymerization was conducted in the same manner as in Example 1 except for use of 1-butene as the α-olefin, injection of ethane at the point C of the α-olefin feed line at an injection rate of 2.8 kg/h, the total circulation amount of ethylene and α-olefin of 310 kg/h, the α-olefin/ethylene molar ratio of 2.33 at the inlet of the reactor, and the reaction temperature of 140° C. The copolymer production rate was 26 kg/h.

EXAMPLE 6

Ethylene/α-olefin copolymerization was conducted in the same manner as in Example 1 except for injection of ethane at the inlet E of the high-pressure recycling separator 10 at an injection rate of 0.6 kg/h, the total circulation amount of ethylene and α-olefin of 360 kg/h, and the α-olefin/ethylene molar ratio of 0.43 at the inlet of the reactor. The copolymer production rate was 39 kg/h.

EXAMPLE 7

Ethylene/α-olefin copolymerization was conducted in the same manner as in Example 1 except for use of propane as the low-density saturated hydrocarbon at an injection rate of 2.6 kg/h, the total ethylene/α-olefin recycling amount of 360 kg/h, the α-olefin/ethylene molar ratio of 0.44, use of diphenylmethylene(cyclopentadienyl)(2,7-dimethylfluorenyl)zirconium dichloride in place of diphenylmethylene(cyclopentadienyl)(fluorenyl)zirconium dichloride of the metallocene catalyst, and the zirconium concentration of 300 μmol/L. The copolymer production rate was 39 kg/h.

EXAMPLE 8

Ethylene/α-olefin copolymerization was conducted in the same manner as in Example 1 except for injection of ethane at the inlet E of the high-pressure recycling separator 10 at an injection rate of 1.6 kg/h, the total circulation amount of ethylene and α-olefin of 360 kg/h, the α-olefin/ethylene molar ratio of 1.00 at the inlet of the reactor, and reaction pressure of 1500 kgf/cm$^2$. The copolymer production rate was 39 kg/h.

EXAMPLE 9

Ethylene/α-olefin copolymerization was conducted in the same manner as in Example 1 except for the absence of the heat exchanger 9, injection of ethane at the inlet E of the high-pressure recycling separator 10 at an injection rate of 0.6 kg/h, the total circulation amount of ethylene and α-olefin of 360 kg/h, the α-olefin/ethylene molar ratio of 0.42 at the inlet of the reactor, and reaction temperature of 180° C. The copolymer production rate was 46 kg/h.

COMPARATIVE EXAMPLE 1

Ethylene/α-olefin copolymerization was conducted in the same manner as in Example 1 except that the low-density saturated hydrocarbon was not injected.

COMPARATIVE EXAMPLE 2

Ethylene/α-olefin copolymerization was conducted in the same manner as in Example 3 except that the low-density saturated hydrocarbon was not injected, and the reaction pressure was 900 kgf/cm$^2$.

COMPARATIVE EXAMPLE 3

Ethylene/α-olefin copolymerization was conducted in the same manner as in Example 5 except that the low-density saturated hydrocarbon was not injected.

COMPARATIVE EXAMPLE 4

Ethylene/α-olefin copolymerization was conducted in the same manner as in Example 8 except that the low-density saturated hydrocarbon was not injected, and the reaction pressure was 900 kgf/cm$^2$.

The results of the Examples and Comparative Examples are shown in Table 1.

As described above, the present invention provides a high-temperature high-pressure process for producing ethylene/α-olefin copolymer in which efficiency of a high-pressure separator is improved with sufficient separation of a high molecular weight copolymer entrained by the unreacted monomer mixture without drop of separation efficiency or clogging of tubing of heat exchangers caused by deposition or adhesion of the high molecular weight copolymer on the inside wall of the high-pressure recycling separator or the tubing of heat exchangers in the high-pressure recycling system. Thereby, a copolymer of a desired density can be produced for a long term without plant shutdown.

What is claimed is:

1. A process for producing an ethylene/α-olefin copolymer comprising steps of copolymerizing ethylene with an α-olefin of three or more carbons in a reactor in the presence of an olefin polymerization metallocene catalyst at a reaction pressure ranging from 300 to 4000 kgf/cm$^2$ at a reaction temperature ranging from the melting point of the copolymer to 300° C.; reducing the pressure of the reaction product to 40–300 kgf/cm$^2$; separating an unreacted monomer mixture from the copolymer by a high-pressure separator; separating an entrained copolymer from the unreacted monomer mixture by a separator in a high-pressure recycling system to recover unreacted monomer mixture; and feeding the recovered unreacted monomer mixture together with the starting ethylene and α-olefin to the reactor, wherein a saturated hydrocarbon of four or less carbons having a density lower than that of the unreacted monomer mixture (hereinafter referred to as a "low-density saturated hydrocarbon") is allowed to coexist in the high-pressure separator.

2. The process for producing an ethylene/α-olefin copolymer according to claim 1, wherein the concentration of the low-density saturated hydrocarbon in the high-pressure separator is controlled in the range of from 4 to 48 mol % of the total amount of the low-density saturated hydrocarbon and the unreacted monomer mixture.

3. The process for producing an ethylene/α-olefin copolymer according to claim 1, wherein the low-density saturated hydrocarbon is injected to the unreacted monomer mixture at the inlet of the separator in the high-pressure recycling system to which the unreacted monomer mixture separated at the high-pressure separator is subsequently introduced.

4. The process for producing an ethylene/α-olefin copolymer according to claim 3, wherein the injection of the low-density saturated hydrocarbon is controlled to keep the concentration of the low-density saturated hydrocarbon in the range of from 5 to 50 mol % of the total of the low-density saturated hydrocarbon and the unreacted monomer mixture.

* * * * *